United States Patent
Jones et al.

(10) Patent No.: US 10,572,768 B2
(45) Date of Patent: Feb. 25, 2020

(54) SELF-ADAPTING GUIDANCE METHOD FOR UNMANNED UNDERWATER VEHICLE DOCKING

(71) Applicant: The United States of America as represented by the Secretary of the Navy, San Diego, CA (US)

(72) Inventors: Anthony D. Jones, San Diego, CA (US); Wayne P. Liu, San Diego, CA (US); Michael H. Tall, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 214 days.

(21) Appl. No.: 15/905,412

(22) Filed: Feb. 26, 2018

(65) Prior Publication Data
US 2019/0266440 A1    Aug. 29, 2019

(51) Int. Cl.
| | |
|---|---|
| *B63G 8/00* | (2006.01) |
| *G06K 9/42* | (2006.01) |
| *G06K 9/46* | (2006.01) |
| *G06K 9/62* | (2006.01) |
| *G06K 9/66* | (2006.01) |
| *G06N 20/00* | (2019.01) |

(52) U.S. Cl.
CPC ............. *G06K 9/6215* (2013.01); *G06K 9/42* (2013.01); *G06K 9/4652* (2013.01); *G06K 9/66* (2013.01); *G06N 20/00* (2019.01); *B63G 8/001* (2013.01); *B63G 2008/008* (2013.01)

(58) Field of Classification Search
CPC ........ B63G 8/001; G06K 9/42; G06K 9/4652; G06K 9/6215; G06K 9/66; G06N 20/00
See application file for complete search history.

(56) References Cited

U.S. PATENT DOCUMENTS

| | | | |
|---|---|---|---|
| 2016/0063705 A1* | 3/2016 | Xu ............................. | G06T 5/50 382/199 |
| 2016/0086050 A1* | 3/2016 | Piekniewski ........ | G06K 9/4671 382/103 |

* cited by examiner

Primary Examiner — Kenny A Cese
(74) Attorney, Agent, or Firm — Naval Information Warfare Center, Pacific; Kyle Eppele; Young Fei (57) ABSTRACT

A method for adjusting the proportional gain value of a proportional controller for use in an unmanned underwater vehicle. The invention includes the steps of: recording at an unmanned underwater vehicle a captured image in the direction of travel; applying a first filter to the captured image; calculating a first distance from each pixel in the captured image to a specified target color; finding the selected pixel from the captured image with the minimum distance from the specified target color, normalizing the image coordinates of the selected pixel into normalized image coordinates; passing the normalized image coordinates as an error value to the proportional controller; calculating a rate of error at the proportional controller; updating the proportional gain according at the proportional controller; and applying a control signal at the proportional controller.

19 Claims, 8 Drawing Sheets

SELF-ADAPTING GUIDANCE METHOD FOR UNMANNED UNDERWATER VEHICLE DOCKING

FEDERALLY FUNDED RESEARCH AND DEVELOPMENT

The Self-Adapting Guidance Method for Unmanned Underwater Vehicle Docking is assigned to the United States Government and is available for licensing and commercial purposes. Licensing and technical inquiries may be directed to the Office of Research and Technical Applications, Space and Naval Warfare Systems Center Pacific (Code 72120), San Diego, Calif., 92152 via telephone at (619) 553-2778 or email at ssc_pac_t2@navy.mil. Reference Navy Case Number 105242.

BACKGROUND OF THE INVENTION

This is a method relating to the use of the visual detection of a target and a proportional control law to guide an unmanned underwater vehicle into a contact for docking. It is capable of self-adjusting the gains used for the unmanned underwater vehicle's steering based on the multiplication of the existing gain by a unique and novel learning function developed for this application.

Physically connecting an unmanned underwater vehicle with an undersea station is a fundamental challenge associated with autonomous undersea vehicle to vehicle docking and transfers. This invention addresses this problem using a vision based steering behavior to enable the autonomous docking of an unmanned undersea vehicle with other unmanned undersea vehicles or undersea stations.

SUMMARY OF THE INVENTION

The present invention is a method for adjusting the proportional gain value of a proportional controller for use in an unmanned underwater vehicle. The invention includes the steps of: recording at an unmanned underwater vehicle a captured image in the direction of travel; applying a first filter to the captured image; calculating a first distance from each pixel in the captured image to a specified target color; finding the selected pixel from the captured image with the minimum distance from the specified target color, normalizing the image coordinates of the selected pixel into normalized image coordinates; passing the normalized image coordinates as an error value to the proportional controller; calculating a rate of error at the proportional controller; updating the proportional gain according at the proportional controller; and applying a control signal at the proportional controller.

The proportional gain may be updated at the proportional controller according to the equation $$K_p = K_{p0} \cdot \left[1 + \alpha\left(\frac{-2}{1 + e^{-A(d\varepsilon^2 - (B \cdot \varepsilon)^2)}} + 1\right)\right]$$

where $K_p$ is the proportional gain value, $K_{p0}$ is the previous proportional gain value, A is the slope tuning parameter, B is the target heading tuning parameter, and $\alpha$ is the learning rate. The control signal $P_{out}$ at the proportional controller may be applied according to the equation $$P_{out} = K_p \cdot \varepsilon$$

where $\varepsilon$ is the error value.

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

While this invention may be embodied in different forms, the drawings and this section describe in detail specific embodiments of the invention with the understanding that the present disclosure is to be considered merely a preferred embodiment of the invention, and is not intended to limit the invention in any way.

Unmanned undersea systems have tremendous potential for undersea services. However, many technological challenges currently limit the effectiveness of these systems. Challenges remain with respect to communications, autonomy, energy storage, and deployment and situational recovery. The present invention addresses some of these challenges by using autonomous guidance and control to guide an unmanned underwater vehicle (UUV) during the docking process.

Figure 1:
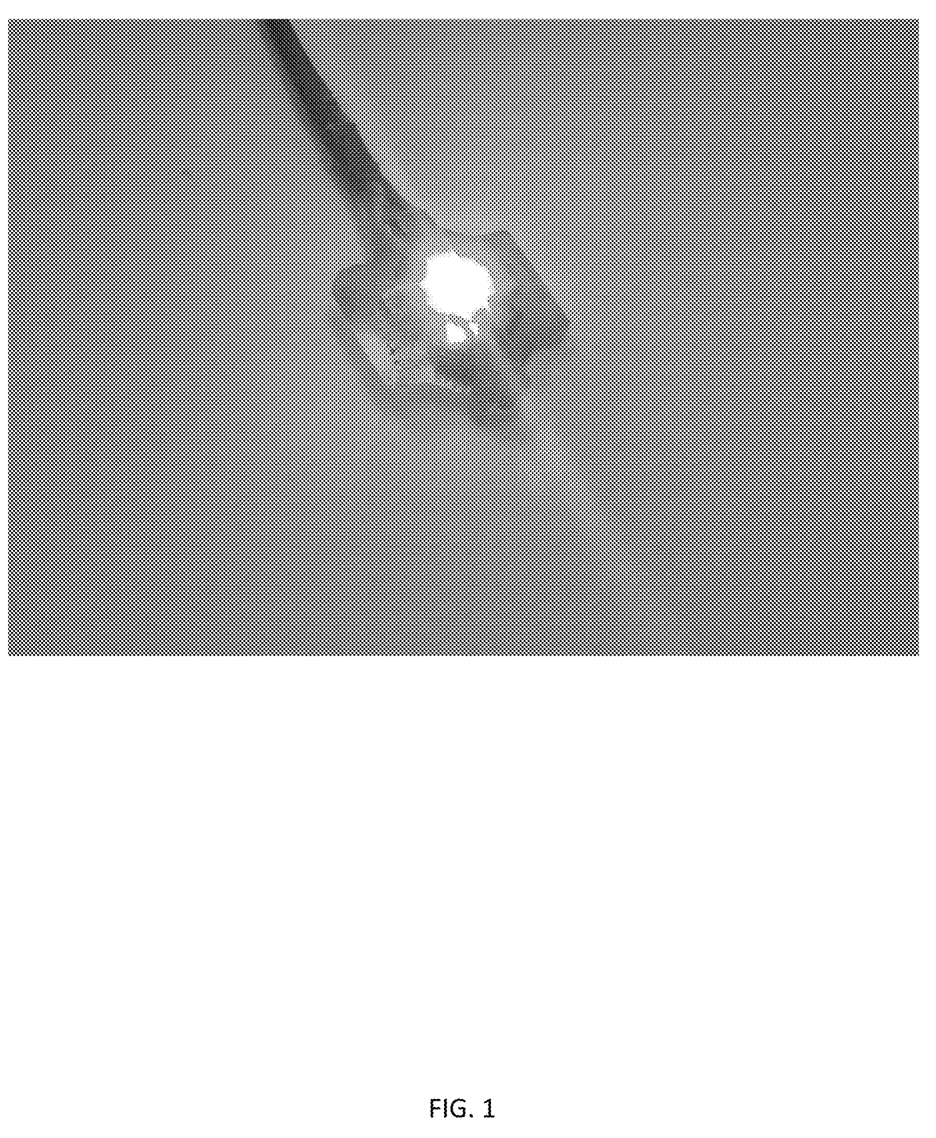
FIG. 1 depicts a potted light emitting diode target beacon.
Figure 2:
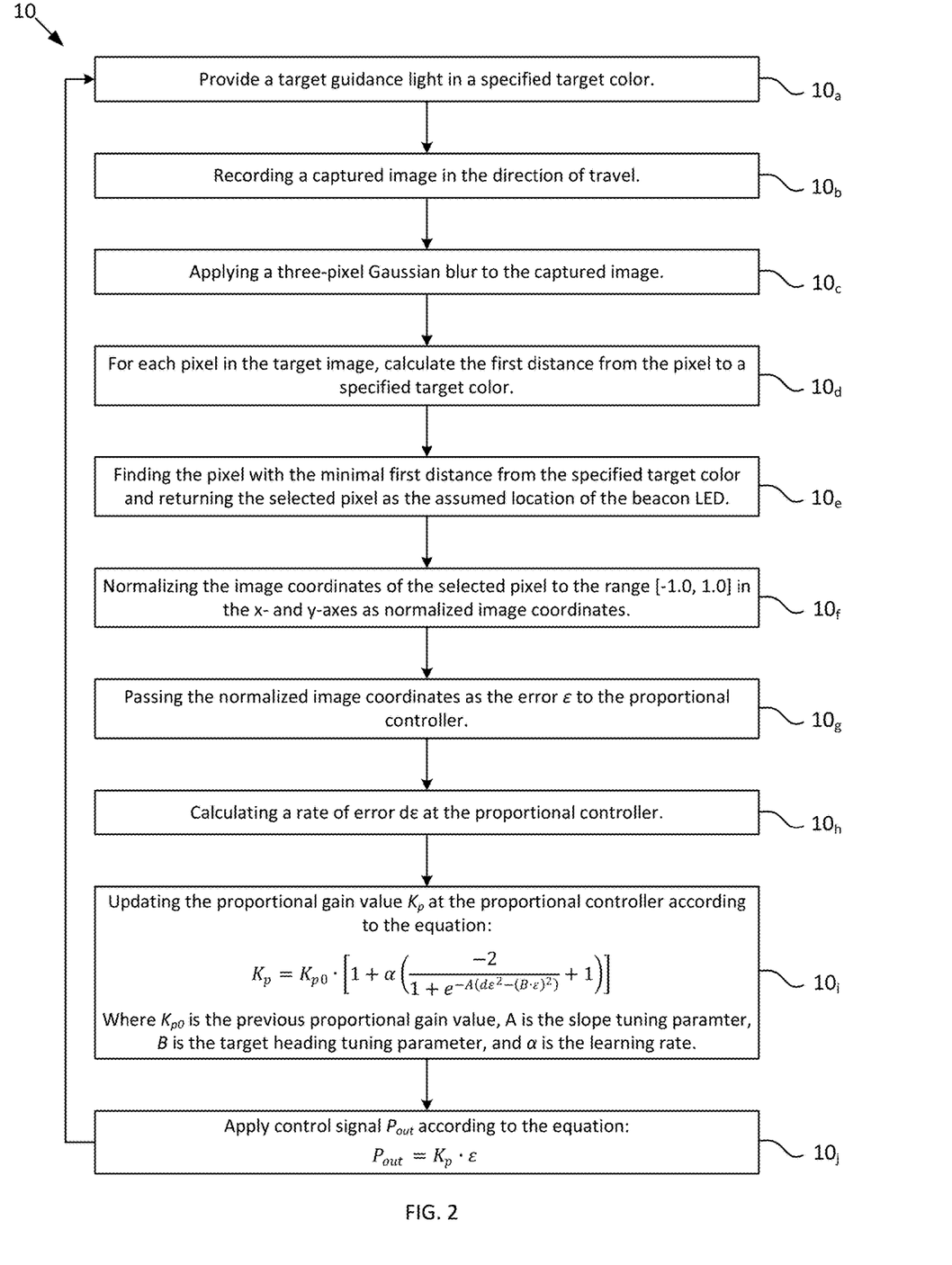
FIG. 2 is a block diagram illustrating steps which can be taken to practice the methods of the present invention according to several embodiments.

In the present embodiment, the present visual target for docking is a potted light emitting diode (LED) target guidance light mounted to a vertical spar. FIG. 1. FIG. 2 depicts a block diagram which illustrates various steps which may be used to practice this preferred embodiment. This target guidance light is provided as a beacon for the UUV to track and guide itself to. Step $10_a$. A blue LED may be used as the specified target color for its comparatively long range visibility underwater. However, because much of the visual field underwater appears naturally blue, the use of a blue LED target guidance light may result in the visual guidance being occasionally disrupted by ambient phenomena. To mitigate this concern, a red LED target guidance light may also be used. The color of the LED used for guidance (the "specified target color") may be chosen for the particular application, balancing the compromises between range of detectability and false positive rates.

In order to promote the simplicity and flexibility of the docking system, dedicated guidance sensors do not need to be added to the UUV. Instead, the UUV's onboard camera imagery can be recorded as a captured image (in the direction of travel) and processed using computer vision software. Step $10_b$. The processed captured image provides input to a proportional controller, which then sends throttle commands to the UUV's thrusters, mimicking the control signals which would normally be generated through the process of translating operator joystick inputs into ROV operational commands. A benefit of this method is that control and guidance problems are addressed primarily through software development without the need for additional hardware integration.

The computer vision software uses a simple color distance filter to locate the target guidance light. The captured image from the onboard camera is initially blurred using a first filter (in this case, a three-pixel diameter Gaussian blur) in order to suppress spurious environmental noise. Step $10_c$. For each pixel in the target image, the pixel's color distance (a "first distance") from the specified target color is calculated. Step $10_d$. The location of the pixel with the minimal first distance from the specified target color (the pixel most similar in color to the specified target color) is returned as the assumed location of the target guidance light (this pixel is referred to as the "selected pixel"). Step $10_e$. A minimum threshold may be applied in order to prevent the system from guiding toward a dissimilar target when a valid target (target guidance light) is not visible in the captured image. The selected pixel image coordinates is then normalized to the range [−1.0, 1.0] in both the x-axis and y-axis, with the origin located at the center of the image (the "normalized image coordinates"). Step $10_f$. The normalized image coordinates are then passed as the error $\varepsilon$ to the proportional controller (the steering controller for the UUV). Step $10_g$.

The docking UUV uses simple proportional controllers for both horizontal steering and vertical depth control. The displacement of the target guidance light in the center of the UUV's visual field (the captured image) represents the error to be minimized in each axis, and a steering command proportional to each error is passed to the thrusters. The vertical thruster's command includes some small bias to account for any net buoyancy that the system has, and is otherwise directly proportional to the visual error. In one embodiment, the UUV can steer using differential throttle commands, so the difference between the commands to the port and starboard thrusters is also proportional to the visual error. The horizontal thruster may include a bias to effect forward motion for homing toward the target guidance light for docking.

In addition to the fixed proportional controller described above, the present invention offers improvements in that it is a self-tuning controller for the UUV's control. In one embodiment, this self-tuning control may be used for the UUV's yaw control. This invention allows the proportional controller to estimate a change in error (the "rate of error $d\varepsilon$") that should correspond to its applied signal. Step $10_h$. The rate of error $d\varepsilon$ is based on the rate of change of the error $\varepsilon$ with respect to each control loop iteration of the proportional controller (in different notation, $d\varepsilon$ may be expressed as $d\varepsilon/dt$, where $d\varepsilon$ represents the change in error value $\varepsilon$, and $dt$ represents a control loop iteration). The invention then monitors predicted and observed performance and adjusts the proportional controller's proportional gain value $K_p$ accordingly.

Figure 3:
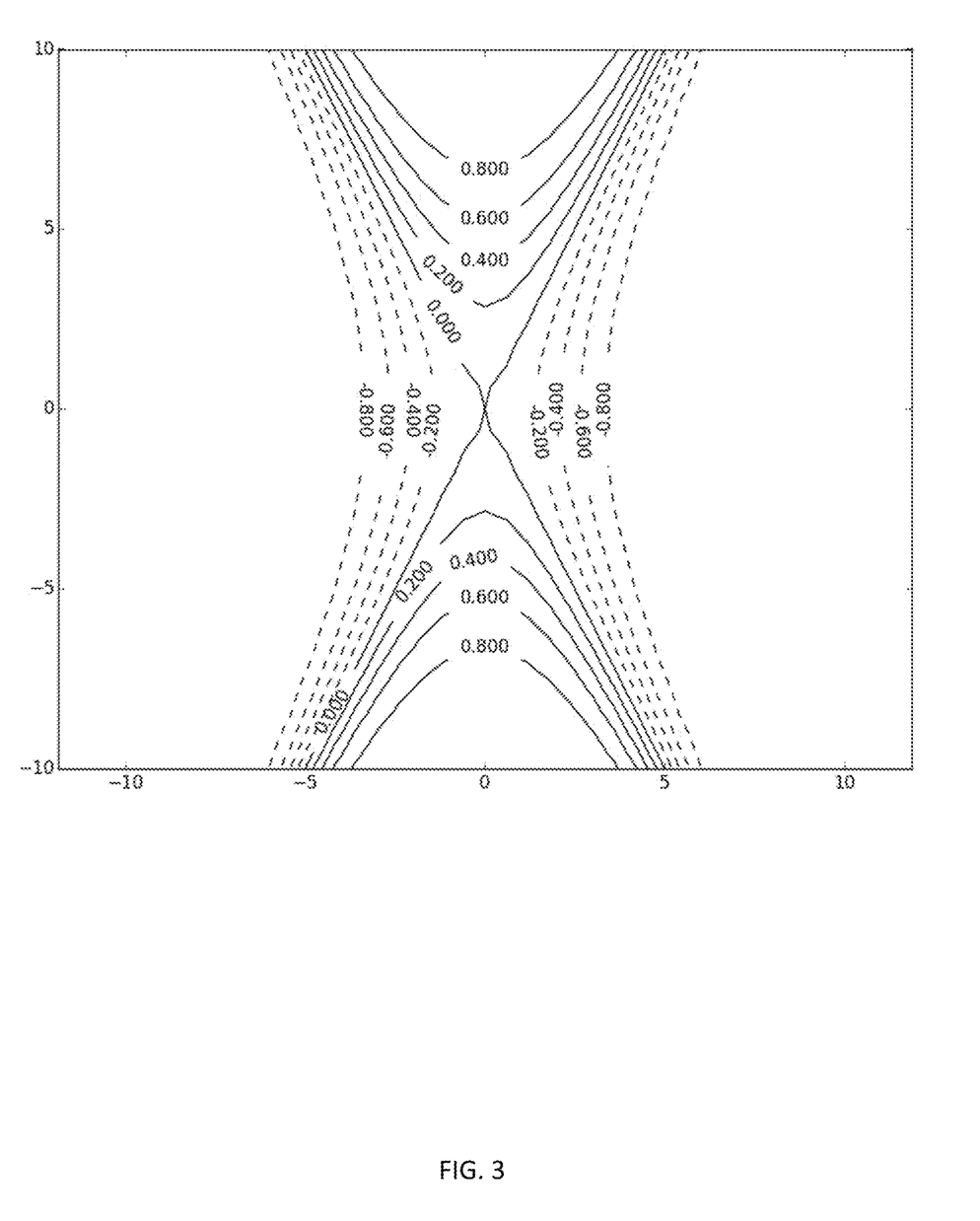
FIG. 3 is a plot depicting the custom bipolar logistic function used by this invention.
Figure 4:
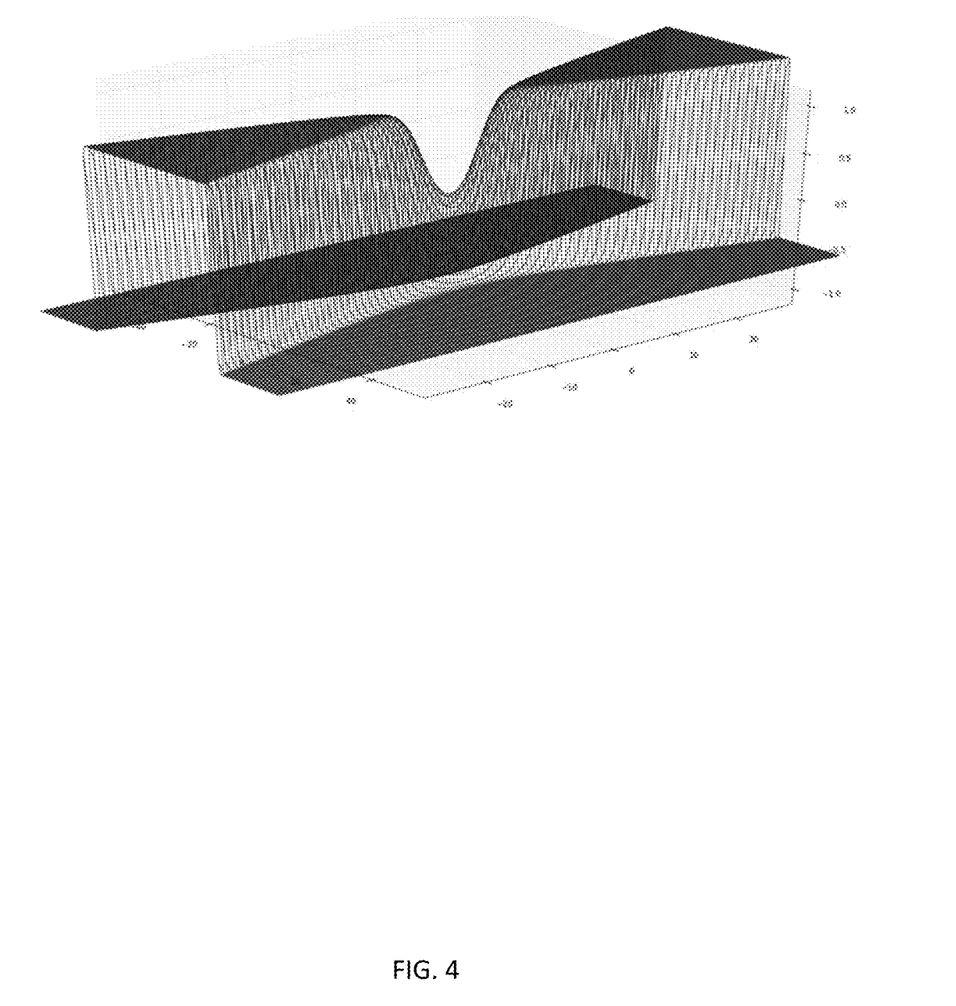
FIG. 4 is a three dimensional wireframe visualization depicting the custom tuning function used by this invention.

At each iteration of the control loop, the proportional gain value $K_p$ is updated according to equation 1 below (step $10_i$):

$$K_p = K_{p0} \cdot \left[1 + \alpha\left(\frac{-2}{1 + e^{-A(d\varepsilon^2 - (B \cdot \varepsilon)^2)}} + 1\right)\right] \quad (1)$$

where $K_{p0}$ is the previous proportional gain value (the proportional gain value from the previous iteration of the control loop), A is the slope tuning parameter, B is the target heading tuning parameter, and $\alpha$ is the learning rate. In one embodiment, values of A=0.2, B=1.0, and $\alpha$=0.05 have yielded successful results. These values may be tuned on a case by case basis. Since A, B, and $\alpha$ are constants, equation 1 represents a three dimensional function, with the error value $\varepsilon$, the rate of error $d\varepsilon$, and the proportional gain value $K_p$ as axes. Inside of the parenthesis of equation 1 is a custom bipolar logistic function ranging from −1 to 1, with the shape shown in FIG. 3. The x-axis of FIG. 3 depicts the rate of error $d\varepsilon$ for the heading, and the y-axis of FIG. 3 depicts the error value $\varepsilon$ of the heading. The result is that equation 1 increases the proportional gain value $K_p$ when the rate of error $d\varepsilon$ for the heading is lower than desired and decreases Kp when the rate of error $d\varepsilon$ for the heading is higher than desired. The maximum change of any iteration of the control cycle is ±a, and approaches zero as the error $\varepsilon$ approaches zero. FIG. 4 depicts a three dimensional wireframe visualization of the $K_p$ adjustment function of equation 1.

After $K_p$ is updated according to equation 1, a control signal $P_{out}$ may be applied at the proportional controller according to equation 2:

$$P_{out} = K_p \cdot \varepsilon$$

After the updated control signal $P_{out}$ is applied, the process is able to return to step $10_a$ and repeat the control loop steps.

Figure 5:
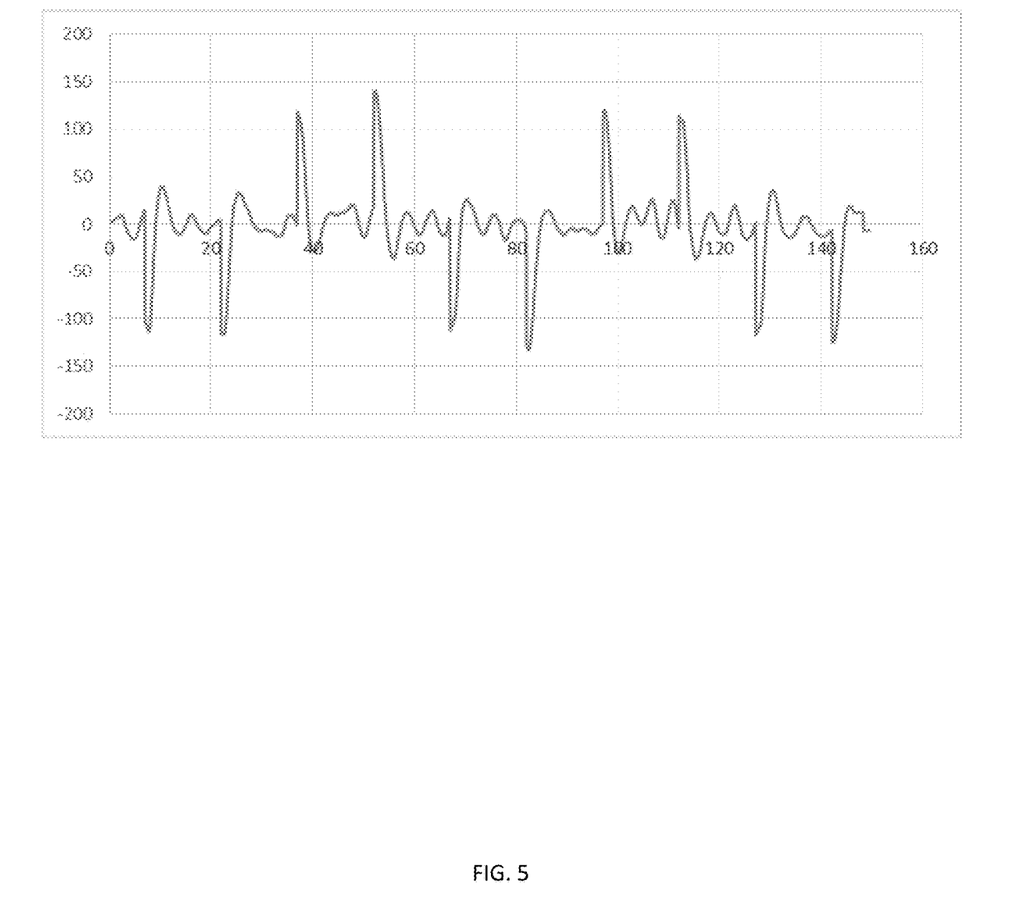
FIG. 5 is a plot depicting the heading error of a properly tuned prior art controller.

To test this inventive method, a UUV was initially commanded to change heading by 120 degrees every 15 seconds using a prior art proportional controller. FIG. 5 depicts the baseline performance of a UUV using a normal prior art proportional controller with a proportional gain value of $K_p$=130. The x-axis of FIG. 5 corresponds with the time in seconds, and the y-axis with the heading error in degrees. Using the prior art proportional controller (without applying the present inventive method), large spikes in error correspond to the instantaneous commands to change UUV heading. The UUV then turns onto the course, and has some small oscillations across the set heading. FIG. 5 is the standard baseline from the prior art for comparison to the improved performance of the present invention.

Figure 6:
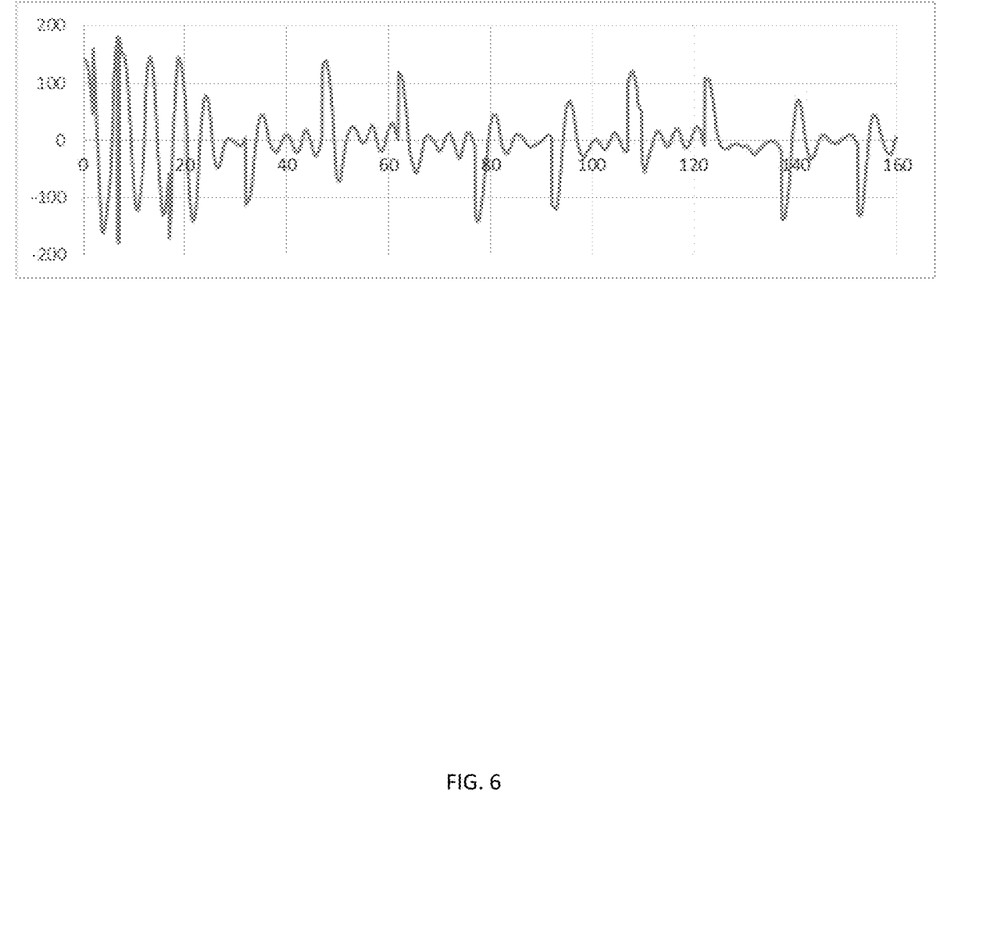
FIG. 6 is a plot depicting the heading error of a vehicle equipped with the present invention when initialized with an overtuned proportional gain value.

FIG. 6 depicts the performance of a UUV initially commanded to change heading by 120 degrees every 15 seconds using the present invention and $K_p$ overtuned and initialized at $K_{p0}$=350. The x-axis of FIG. 6 corresponds with the time in seconds, and the y-axis with the heading error in degrees. Initially, FIG. 6 exhibits large oscillations. However, these oscillations decrease after the first 40 seconds, after which the system has "learned" and corrected for the initially overtuned $K_p$. The oscillations depicted in FIG. 6 closely resemble the oscillations of FIG. 5 after the present invention has had the opportunity to "learn" and tune for an ideal $K_p$ value. Stated differently, the learning proportional controller in the present invention can adjust itself from improper tuning, and restore the performance of a basic proportional controller to that of an optimized system without manual user input.

Figure 7:
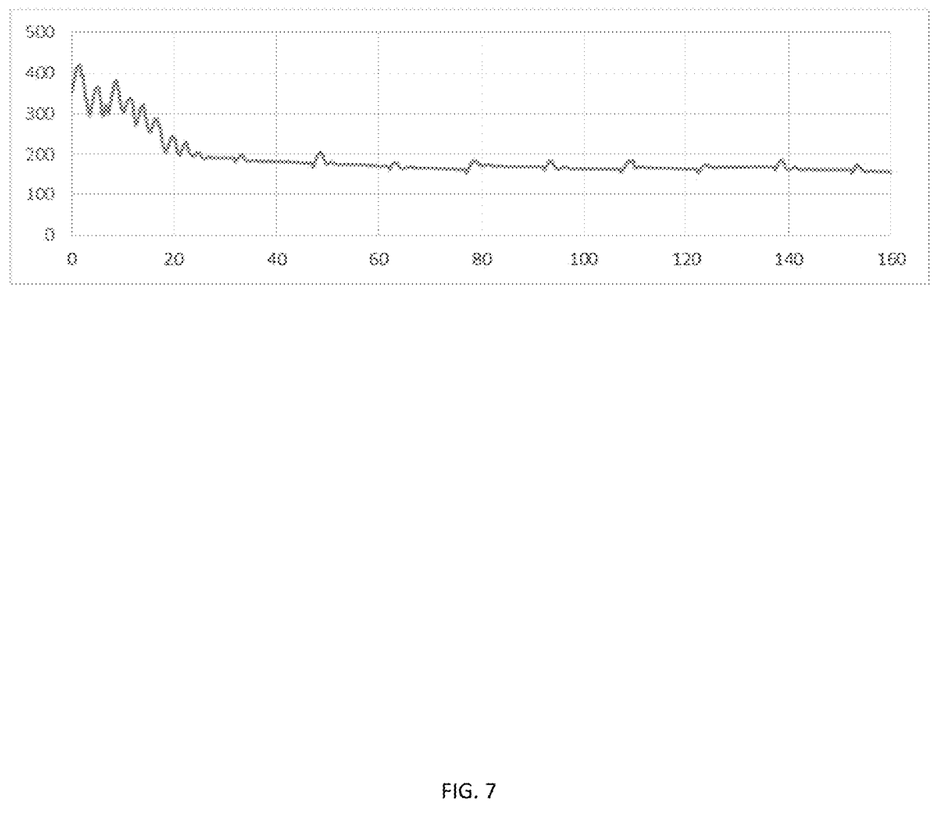
FIG. 7 is a plot depicting the self-correcting behavior of the proportional controller according to the present invention when initialized with an overtuned proportional gain value.

FIG. 7 depicts the value of $K_p$ as the present invention "learns" and corrects for the initially overtuned value of $K_{p0}$=350. The x-axis of FIG. 7 corresponds with time in seconds, and the y-axis with the value of $K_p$. The diminishing of $K_p$ from 350 upon startup to a value between 150 and 200 after the first 20 seconds corresponds with the reduced oscillations depicted in FIG. 6. The small spikes of $K_p$ values shown in FIG. 7 correspond to the commanded heading changes. Since the learning function is trying to track an ideal rate of error dε for the heading, the initial rate of zero upon receiving a command produces an increase in $K_p$. However, as the UUV turns toward its set point, the desired rate of error dε for the heading decreases, and $K_p$ is accordingly reduced to a more consistent value.

Figure 8:
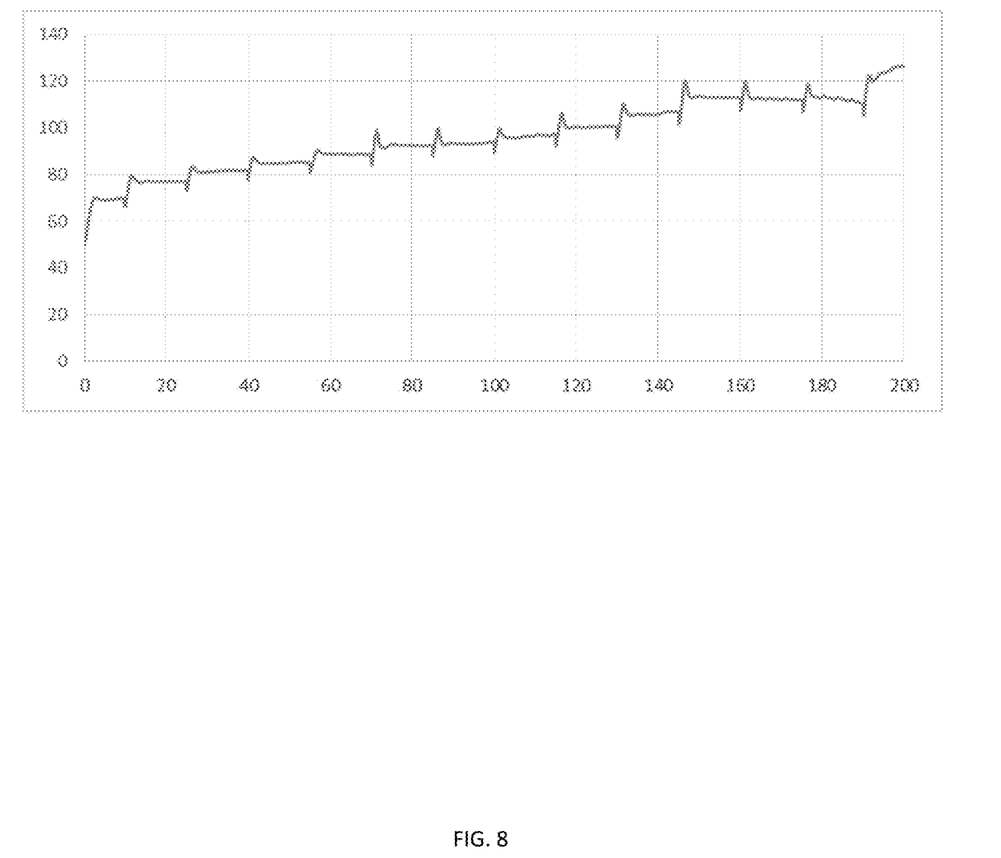
FIG. 8 is a plot depicting the self-correcting behavior of the proportional controller according to the present invention when initialized with an undertuned proportional gain value.

To ensure the learning system was tending toward a finite value rather than just tending toward zero, the UUV equipped with the present invention was commanded to change heading by 120 degrees every 15 seconds, but initialized with an undertuned value of $K_p$=50. FIG. 8 depicts the value of $K_p$ as the present invention "learns" and corrects for the initially undertuned value of $K_{p0}$=50. The x-axis of FIG. 8 corresponds with the time in seconds, and the y-axis with the value of $K_p$. FIG. 8 shows that as the system ran, it progressively increased the value of $K_p$, which suggests that the system will tend toward a workable setting for $K_p$ which will depend on the vehicle's dynamics and the tuning of the learning function.

We claim:

1. A method for adjusting a proportional gain value of a proportional controller for use in an unmanned underwater vehicle comprising the following steps:
   recording at the unmanned underwater vehicle a captured image in a direction of travel;
   applying a first filter to the captured image;
   for each pixel in the captured image, calculate a first distance from the pixel to a specified target color;
   finding a selected pixel with the minimum first distance;
   normalizing image coordinates of the selected pixel into a normalized image coordinates;
   passing the normalized image coordinates as an error value ε to the proportional controller;
   calculating at the proportional controller a rate of error dε;
   updating at the proportional controller a proportional gain value Kp according to the equation:

$$K_p = K_{p0} \cdot \left[1 + \alpha\left(\frac{-2}{1 + e^{-A(d\varepsilon^2 - (B \cdot \varepsilon)^2)}} + 1\right)\right],$$

where Kpo is a previous proportional gain value, A is a slope tuning parameter, B is a target heading tuning parameter, and a is a learning rate,
   applying a control signal Pout at the proportional controller according to the equation Pout=Kp·ε.

2. The method of claim 1, wherein the specified target color is blue.

3. The method of claim 1, wherein the specified target color is red.

4. The method of claim 1, wherein the first filter is a Gaussian blur.

5. The method of claim 1, wherein the first filter is a three-pixel Gaussian blur.

6. The method of claim 1, wherein at the normalizing step, the selected pixels are normalized to a range [−1.0, 1.0] in an x-axis.

7. The method of claim 1, wherein at the normalizing step, the selected pixels are normalized to a range [−1.0, 1.0] in a y-axis.

8. The method of claim 1, wherein the slope tuning parameter A is 0.2.

9. The method of claim 1, wherein the target heading tuning parameter B is 1.0.

10. The method of claim 1, wherein the learning rate α is 0.05.

11. A method for adjusting a proportional gain value of a proportional controller for use in an unmanned underwater vehicle comprising the following steps:
    providing a target guidance light in a specified target color;
    recording at the unmanned underwater vehicle a captured image in a direction of travel;
    applying a Gaussian filter to the captured image;
    for each pixel in the captured image, calculate a first distance from the pixel to a specified target color;
    finding a selected pixel with the minimum first distance;
    normalizing image coordinates of the selected pixel into a normalized image coordinates, wherein the selected pixels are normalized to a range [−1.0, 1.0] in an x-axis, and
    wherein the selected pixels are normalized to the range [−1.0, 1.0] in a y-axis;
    passing the normalized image coordinates as an error value ε to the proportional controller;
    calculating at the proportional controller a rate of error dε;
    updating at the proportional controller a proportional gain value Kp according to the equation:

$$K_p = K_{p0} \cdot \left[1 + \alpha\left(\frac{-2}{1 + e^{-A(d\varepsilon^2 - (B \cdot \varepsilon)^2)}} + 1\right)\right],$$

where Kpo is a previous proportional gain value, A is a slope tuning parameter, B is a target heading tuning parameter, and a is a learning rate,
    applying a control signal Pout at the proportional controller according to the equation Pout=Kp·ε.

12. The method of claim 11, wherein the specified target color is blue.

13. The method of claim 11, wherein the specified target color is red.

14. The method of claim 11, wherein the Gaussian filter is a three-pixel Gaussian blur.

15. The method of claim 11, wherein the slope tuning parameter A is 0.2.

16. The method of claim 11, wherein the target heading tuning parameter B is 1.0.

17. The method of claim 11, wherein the learning rate α is 0.05.

18. A method for adjusting a proportional gain value of a proportional controller for use in an unmanned underwater vehicle comprising the following steps:
    providing a target guidance light in a specified target color;
    recording at the unmanned underwater vehicle a captured image in a direction of travel;
    applying a Gaussian filter to the captured image;
    for each pixel in the captured image, calculate a first distance from the pixel to a specified target color;
    finding a selected pixel with the minimum first distance;
    normalizing image coordinates of the selected pixel into a normalized image coordinates, wherein the selected pixels are normalized to a range [−1.0, 1.0] in an x-axis, and
    wherein the selected pixels are normalized to the range [−1.0, 1.0] in a y-axis;
    passing the normalized image coordinates as an error value ε to a proportional controller;

calculating at the proportional controller a rate of error dε;
updating at the proportional controller a proportional gain value Kp according to the equation:

$$K_p = K_{p0} \cdot \left[1 + \alpha\left(\frac{-2}{1 + e^{-A(d\varepsilon^2 - (B\cdot\varepsilon)^2)}} + 1\right)\right],$$

where Kpo is a previous proportional gain value, A is a slope tuning parameter, B is a target heading tuning parameter, and a is a learning rate,
applying a control signal Pout at the proportional controller according to the equation Pout=$Kp\cdot\varepsilon$;

wherein the Gaussian filter is a three-pixel Gaussian blur;
wherein the slope tuning parameter A is 0.2;
wherein the target heading tuning parameter B is 1.0; and
wherein the learning rate α is 0.05.

19. The method of claim 18, wherein the specified target color is blue.

\* \* \* \* \*